US010496928B2

(12) United States Patent
Oh et al.

(10) Patent No.: US 10,496,928 B2
(45) Date of Patent: Dec. 3, 2019

(54) NON-FACTOID QUESTION-ANSWERING SYSTEM AND METHOD

(71) Applicant: National Institute of Information and Communications Technology, Tokyo (JP)

(72) Inventors: Jonghoon Oh, Tokyo (JP); Kentaro Torisawa, Tokyo (JP); Chikara Hashimoto, Tokyo (JP); Motoki Sano, Tokyo (JP); Stijn De Saeger, Tokyo (JP); Kiyonori Ootake, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 1015 days.

(21) Appl. No.: 14/900,758

(22) PCT Filed: May 15, 2014

(86) PCT No.: PCT/JP2014/062913
§ 371 (c)(1),
(2) Date: Dec. 22, 2015

(87) PCT Pub. No.: WO2014/208213
PCT Pub. Date: Dec. 31, 2014

(65) Prior Publication Data
US 2016/0155058 A1    Jun. 2, 2016

(30) Foreign Application Priority Data

Jun. 27, 2013 (JP) ................................ 2013-134649

(51) Int. Cl.
*G06N 5/04* (2006.01)
*G06N 99/00* (2019.01)
*G06N 20/00* (2019.01)

(52) U.S. Cl.
CPC ............. *G06N 5/041* (2013.01); *G06N 20/00* (2019.01)

(58) Field of Classification Search
CPC ............................. G06N 5/041; G06N 20/00
See application file for complete search history.

(56) References Cited

U.S. PATENT DOCUMENTS 6,925,452 B1 * 8/2005 Hellerstein .......... G06N 99/005
                                                706/12
10,002,189 B2 * 6/2018 Cheyer ............. G06F 17/30675
(Continued)

OTHER PUBLICATIONS

Richard Johansson, Alessandro Moschitti, Extracting Opinion Expressions and Their Polarities—Exploration of Pipelines and Joint Models, Jun. 2011, Assoc.for Computational Linguistics, Proceedings of the 49th Annual Meeting of the Assoc. for Computational Linguistics: Human Language Technologies, 104 (Year: 2011).*

(Continued)

*Primary Examiner* — Li Wu Chang
(74) *Attorney, Agent, or Firm* — Renner, Otto, Boisselle & Sklar, LLP

(57) ABSTRACT

A question-answering system capable of appropriately answering a non-factoid question. The question-answering system responsive to a question, for taking out answer candidates from an object document storage unit; extracting plausible ones from the answer candidates; recognizing causal relation expression included in extracted answer candidates; determining whether or not a recognized causal relation is relevant as an answer; generating a feature vector related to a combination of the question and the searched answer candidate; and for calculating, when a feature vector is given, a score indicating a degree of how correct an answer candidate is as an answer to the question, for the question and the answer candidate as a source of the feature (Continued)

vector, and for outputting, as the answer to the question, an answer candidate having the highest score.

5 Claims, 10 Drawing Sheets

(56) References Cited

U.S. PATENT DOCUMENTS

| | | | | |
|---|---|---|---|---|
| 2012/0016678 A1* | 1/2012 | Gruber | ............... | G06F 17/3087 704/275 |
| 2012/0246054 A1* | 9/2012 | Sastri | ..................... | G06Q 40/06 705/37 |
| 2015/0026106 A1* | 1/2015 | Oh | ..................... | G06F 17/2705 706/12 |
| 2015/0095770 A1* | 4/2015 | Mani | ................... | G06F 17/2745 715/254 |

OTHER PUBLICATIONS

Surdeanu et al. "Learning to Rank Answers to Non-factoid Questions from Web Collections", ACL, 2011, pp. 351-383.*

Ryuichiro Higashinaka et al.: "Automatically Acquiring Causal Expression Patterns from Relation-annotated Corpora to Improve Question Answering for why-Questions", ACM Transactions on Asian Language Information Processing, Association for Computing Machinery, New York, NY, US, vol. 7, No. 2, Apr. 1, 2008, pp. 1-29, XP058 I 46396, ISSN: 1530-0226. DOI: 10.1145/1362782. 1362785.

Jong-hoon Oh et al.: "Why-Question Answering using Intra- and Inter-Sentential Causal Relations", The 51st Annual Meeting of the Association for Computational Linguistics (ACL 2013, Aug. 2013 (Aug. 2013), pp. 1733-1743, XP055309080.

International Search report for corresponding International Application No. PCT/JP2014/062913 dated Jul. 17, 2014.

Masaki Murata et al., A System for Answering Non Factoid Japanese Questions by using Passage Retrieval Weighted Based on Type of Answer, In Proceedings of NTCIR-6, 2007.

Ryuichiro Higashinaka et al., Corpus-Based Question Answering for Why-Questions, In Proceedings of IJCNLP, pp. 418-425, 2008.

Jong-Hoon Oh et al., Why Question Answering Using Sentiment Analysis and Word Classes, In Proceedings of EMNLP-CoNLL, pp. 368-378, 2012.

* cited by examiner

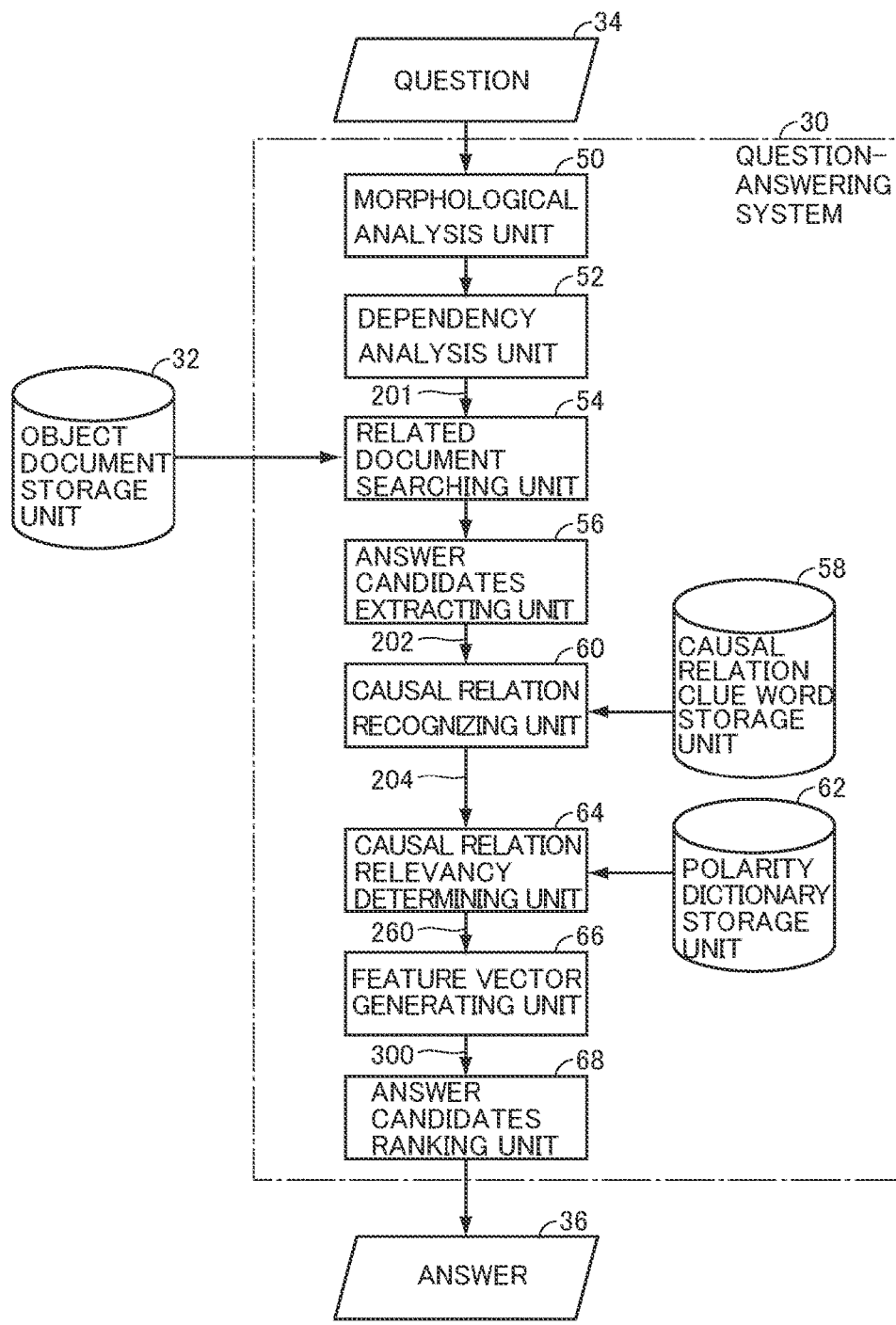

FIG. 2

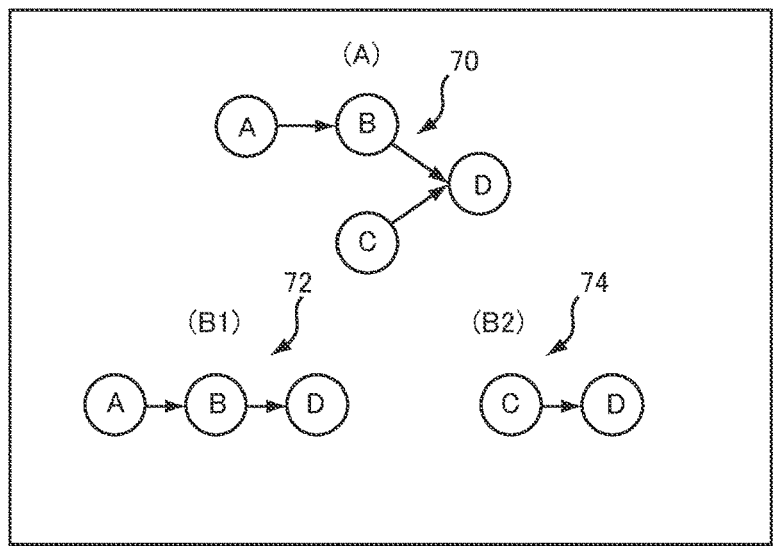

FIG. 3

| FORM OF CAUSAL RELATION | EXAMPLES OF EXPRESSIONS |
|---|---|
| CAUSAL RELATION BETWEEN NOUN PHRASES IN A SENTENCE | 地震が原因となる津波<br>　　80　　　84　　82<br>(EARTHQUAKE IS A CAUSE OF TSUNAMI) |
| CAUSAL RELATION BETWEEN NOUN PHRASE AND VERB PHRASE IN A SENTENCE | 海底地震が原因で津波が起きる。<br>　　86　　　90　　　88<br>(TSUNAMI OCCURS BECAUSE OF UNDERSEA EARTHQUAKE) |
| CAUSAL RELATION BETWEEN A CLAUSE AND A VERB PHRASE IN A SENTENCE | 地震で陥没した海底に海水が流れ込んで水位格差が起こるため津波が発生します。<br>　　92　　　96　　　94<br>(SEAWATER FLOWS TO OCEAN BOTTOM COLLAPSED BY THE EARTHQUAKE AND WATER LEVEL DIFFERENCE GENERATES, AND HENCE TSUNAMI ARISES) |
| CAUSAL RELATION SPREADING OVER TWO SENTENCES | 地震が海底で起きた場合、海底の動きに伴って海水面が盛り上がり、一気に崩れていきます。<br>これが原因で津波が発生します。　102<br>　　98　　100<br>(WHEN AN EARTHQUAKE OCCURS AT THE BOTTOM OF SEA, AS THE OCEAN FLOOR RISES, SEAWATER LEVEL RISES AND THEN DESCENDS SUDDENLY. THIS IS A CAUSE OF TSUNAMI) |

FIG. 4

| | |
|---|---|
| QUESTION: WHY DOES A TSUNAMI OCCUR? | |
| ANSWER | 地震で陥没した海底に海水が流れ込んで水位格差が起こるため津波が発生します。<br>〜92  〜96  〜94<br>(SEAWATER FLOWS TO OCEAN BOTTOM COLLAPSED BY THE EARTHQUAKE AND WATER LEVEL DIFFERENCE GENERATES, AND HENCE TSUNAMI ARISES) |
| NOT AN ANSWER | 海岸林は津波のエネルギーを減少させ、水位速度を下げるため、津波を弱める効果がある。<br>〜110  〜114  〜112<br>(COASTAL FOREST REDUCES ENERGY OF TSUNAMI AND DECREASES WATER LEVEL AND SPEED, AND HENCE EFFECTIVE TO WEAKEN TSUNAMI) |

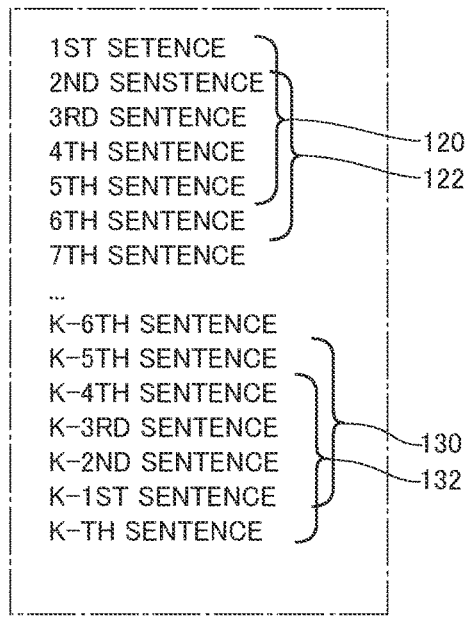

| | |
|---|---|
| ANSWER CANDIDATE1 | …ことが分かっています。地震で陥没した海底に海水が流れ込んで水位格差が起こるため津波が発生します。したがって…<br>(…IS KNOWN. SEAWATER FLOWS TO OCEAN BOTTOM COLLAPSED BY THE EARTHQUAKE AND WATER LEVEL DIFFERENCE GENERATES, AND HENCE TSUNAMI ARISES. THEREFORE…) |
| ANSWER CANDIDATE2 | …が植林されている。海岸林は津波のエネルギーを減少させ、水位速度を下げるため、津波を弱める効果がある。しかし…<br>(…ARE PLANTED. COASTAL FOREST REDUCES ENERGY OF TSUNAMI AND DECREASES WATER LEVEL AND SPEED, AND HENCE EFFECTIVE TO WEAKEN TSUNAMI. IT IS NOTED, HOWEVER,…) |
| ANSWER CANDIDATE3 | …が発生することが懸念されます。地震が海底で起きた場合、海底の動きに伴って海水面が盛り上がり、一気に崩れていきます。これが原因で津波が発生します。このような津波が…<br>(…CONCERNED. WHEN AN EARTHQUAKE …OM OF SEA, AS THE OCEAN …VEL RISES AND …IS A CAUSE |

FIG. 7

| | |
|---|---|
| ANSWER CANDIDATE1 | 地震で陥没した海底に海水が流れ込んで水位格差が起こるため津波が発生します。<br>(SEAWATER FLOWS TO OCEAN BOTTOM COLLAPSED BY THE EARTHQUAKE AND WATER LEVEL DIFFERENCE GENERATES, AND HENCE TSUNAMI ARISES.) |
| ANSWER CANDIDATE2 | 海岸林は津波のエネルギーを減少させ、水位速度を下げるため、津波を弱める効果がある。<br>(COASTAL FOREST REDUCES ENERGY OF TSUNAMI AND DECREASES WATER LEVEL AND SPEED, AND HENCE EFFECTIVE TO WEAKEN TSUNAMI.) |
| ANSWER CANDIDATE3 | 地震が海底で起きた場合、海底の動きに伴って海水面が盛り上がり、一気に崩れていきます。これが原因で津波が発生します。<br>(…KE OCCURS AT THE BOTTOM …OR RISES, SEAWATER …SUDDENLY |

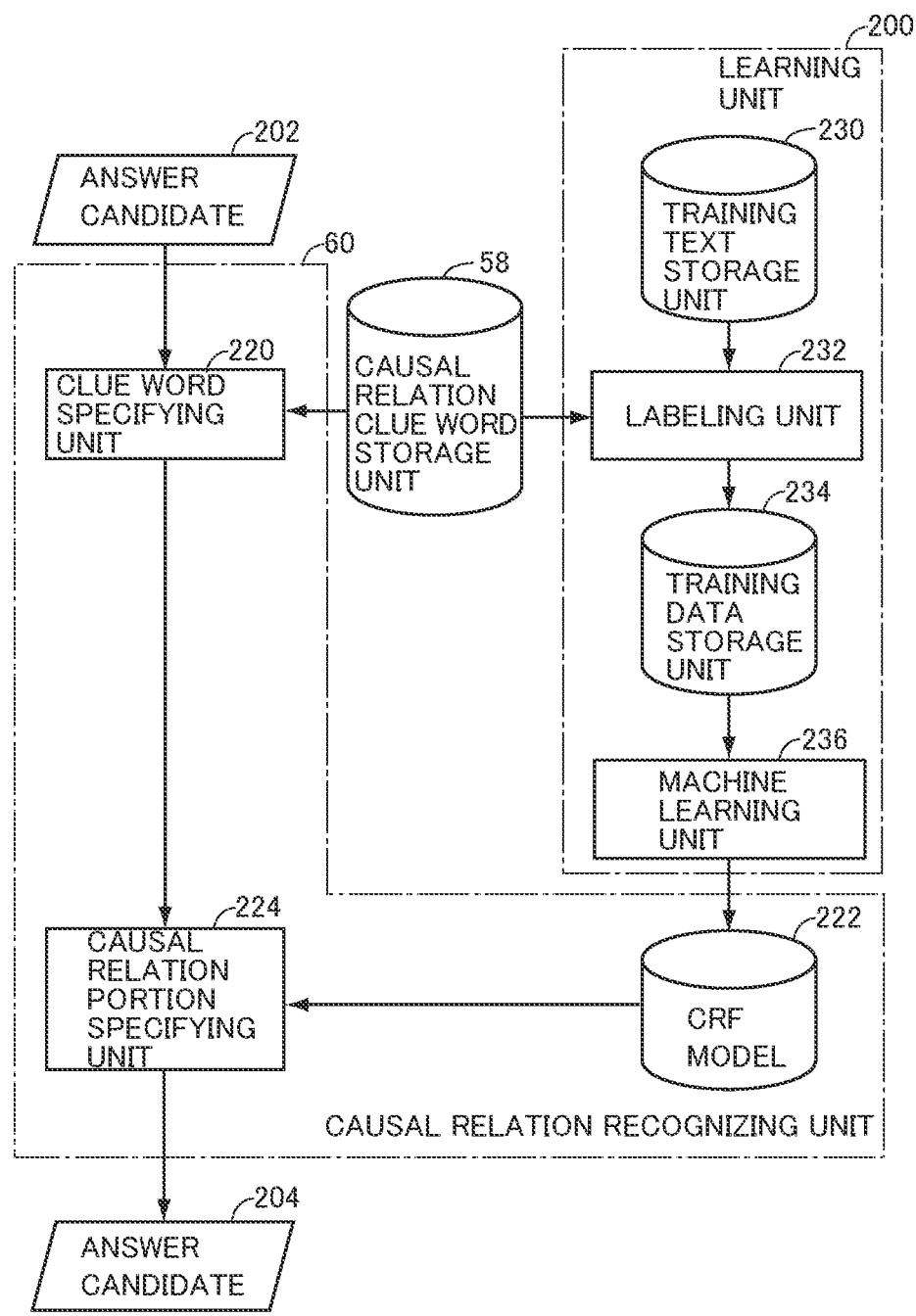

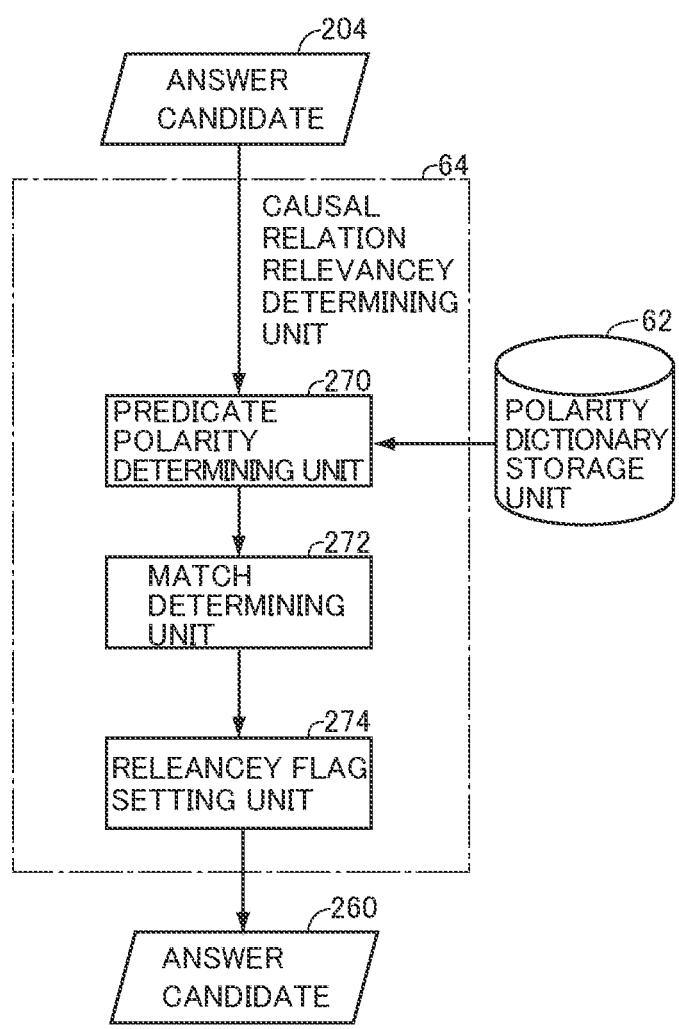

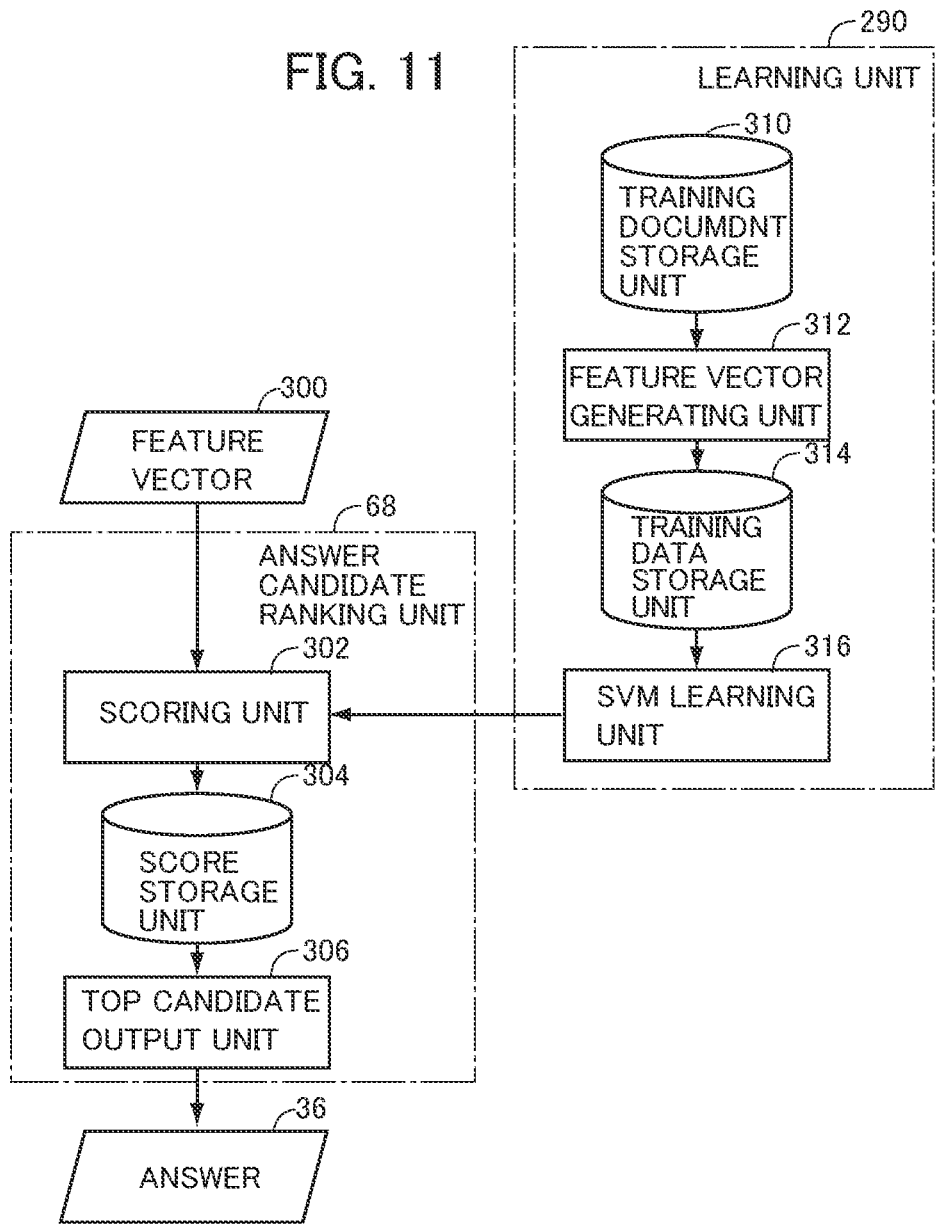

FIG.12

| | |
|---|---|
| MSA1 | Morpheme n-grams, word phrase n-grams, and syntactic dependency n-grams in a question and its answer, where n ranges from 1 to 3. N-grams in a question and those in an answer are distinguished. |
| MSA2 | MSA1's n-grams in an answer candidate that contain a question term. |
| MSA3 | MSA1's n-grams that contain a clue term including riyuu (reason), gen'in (cause), and youin (cause). These n-grams in a question and those in an answer candidate are distinguished. |
| MSA4 | The ratio of the number of question terms in an answer candidate to the total number of question terms. |
| SWC1 | Word class n-grams in a question and its answer candidate. These n-grams in a question and those in an answer candidate are distinguished. |
| SWC2 | SA@W1's n-grams in an answer candidate whose original MSA1's n-grams contain any question term. |
| SA@W1 | Word polarity n-grams in a question and its answer candidate. These n-grams in a question and those in an answer candidate are distinguished. |
| SA@W2 | SA@W1's n-grams in an answer candidate whose original MSA1 n-grams contain any question term. |
| SA@W3 | Joint class-polarity n-grams in a question and its answer candidate. These n-grams in a question and those in an answer candidate are distinguished. |
| SA@W4 | SA@W1's n-grams in an answer candidates whose original MSA1 n-grams contain any question term. |
| SA@P1 | The indicator for polarity agreement between evaluation phrases, one in a question and the other in an answer candidate: 1 if any pair of such evaluation phrases has polarity in agreement, 0 otherwise. |
| SA@P2 | The phrase-polarity (positive or negative) of a pair of evaluation phrases for which the indicator in SA@P1 is 1. |
| SA@P3 | Morpheme n-grams, word phrase n-grams, and syntactic dependency n-grams in evaluation phrases are coupled with their phrase-polarity, where n ranges from 1 to 3. These n-grams in a question and those in an answer candidate are distinguished. |
| SA@P4 | SA@P3's n-grams in an answer candidates that contain a question term. |
| SA@P5 | The ratio of the number of question terms in sentences that have evaluation phrases in answer candidates to the total number of question terms. |
| SA@P6 | Word class n-grams in evaluation phrases are coupled with phrase-polarity. These n-grams in a question and those in an answer candidate are distinguished. |
| SA@P7 | SA@P6's n-grams in an answer candidates, whose original MSA1's n-grams include any question term. |
| SA@P8 | Joint class-polarity n-grams in evaluation phrases of a question and its answer candidate are coupled with phrase-polarity of the evaluation phrases. These n-grams in a question and those in an answer candidate are distinguished. |
| SA@P9 | SA@P8's n-grams in an answer candidates, whose original MSA1's n-grams include any question term. |
| SA@P10 | A pair of SA@P6's n-grams, one from evaluation phrases in a question and the other from those in an answer candidate, where the two evaluation phrases should have the same evaluation orientation. |

NON-FACTOID QUESTION-ANSWERING SYSTEM AND METHOD

TECHNICAL FIELD

The present invention relates to a question-answering system using a computer and a network and, more specifically, to a question-answering system to a so-called non-factoid question, such as a why-type question asking a reason for something.

BACKGROUND ART

Question-answering (QA) research for questions related to some facts, a so-called factoid question, has recently achieved great success. Recently, question-answering systems have been remarkably improved as demonstrated by IBM's Watson, Apple's Siri and so on, and some systems have already been commercially used. Similar developments are made by companies other than those mentioned above. On factoid questions, accuracy of such systems is reported to be about 85%.

On the other hand, why-type question-answering, a task to extract an answer or answers to a question asking a reason why some event occurs, such as "why we get cancer?" has been recognized as far more difficult than to answer a factoid question. The products of IBM and Apple mentioned above do not handle why-type questions.

In this regard, Non-Patent Literature 1 cited below discloses a so-called information retrieval technique in which a word such as "reason" is added to a query of information retrieval to find a passage including an answer to a given why-type question from a huge amount of documents. Non-Patent Literature 2 discloses a technique of specifying an answer through supervised learning, using, as features, word pairs and patterns appearing in a manually prepared database of word pairs representing causes and results, or in a manually prepared database of syntax patterns representing reasons.

Separate from above, Non-Patent Literature 3 discloses a technique of specifying an answer through supervised learning, using, as features including morpho-syntactic features such as morphological features, that is n-grams of morphemes and their part-of-speech tags, and structural features of texts, that is, partial syntactic trees, and semantic features such as semantic classes of words, evaluation expressions.

CITATION LIST

Non Patent Literature 10

NPL 1: Masaki Murata, Sachiyo Tsukawaki, Toshiyuki Kanamaru, Qing Ma, and Hitoshi Isahara. A system for answering non-factoid Japanese questions by using passage retrieval weighted based on type of answer. In Proceedings of NTCIR-6, 2007.
NPL2: Ryuichiro Higashinaka and Hideki Isozaki. Corpus-based question answering for why-questions. In Proceedings of IJCNLP, pages 418-425., 2008. 15
NPL3: Jong-Hoon Oh, Kentaro Torisawa, Chikara Hashimoto, Takuya Kawada, Stijn De Saeger, Jun'ichi Kazama and Yiou Wang. Why Question Answering using Sentiment Analysis and Word Classes, In Proceedings of EMNLP-CoNLL 2012, pp.368-378.

SUMMARY OF INVENTION

Technical Problem

Each of the prior art techniques described above is useful. From the view point of fully reflecting the nature of a task on the features used and other information, however, there still seems to be a room for improvement. Particularly in the method of reflecting the task nature, it is important to more effectively use causal relations because they are considered as an important clue for finding answers to why-type questions. Conventionally, however, attention has been paid only to a causal relation between noun phrases. Further, since it is considered that the causal relation between noun phrases appear principally in one sentence, its extraction has been limited to the one between two noun phrases in the same sentence.

Actually, however, a causal relation in a text is expressed by not only two noun phrases but also a noun phrase and a verb phrase. Further, a causal relation between two sentences may appear in a text, though such situation has been overlooked conventionally. In short, because such various types of causal relations appear in document data, it is necessary to recognize those causal relations and to effectively use such information for extracting an answer or answers to a why-type question. Conventionally, however, such variation of causal relations has been overlooked in this field.

Further, it is not still clear how such causal relations described above should be used for extracting from a text an answer to a question.

Therefore, an object of the present invention is to provide a non-factoid question-answering system capable of giving appropriate answers to non-factoid questions, by appropriately handling various expressions of causal relations appearing in documents.

Solution to Problem

According to a first aspect, the present invention provides a non-factoid question-answering system, receiving a non-factoid question and generating an answer to the question, used connected to document storage means for storing a plurality of computer-readable documents. The system includes: candidate search means, responsive to an input of a question, for taking out answer candidates to the question from the document storage means; feature generation means, responsive to the candidate search means having searched answer candidates, for generating, for combinations of the question and each of its answer candidates searched by the candidate search means, a set of prescribed features; and answer selection means for calculating, when a set of the features generated by the feature generation means is given, for the question and the answer candidate as a base for generating the set of features, a score representing a degree of plausibility of the answer candidate as a correct answer to the question, and outputting an answer candidate having the highest score as an answer to the question. The feature generation means includes: first feature calculating means for calculating, for the question and its answer candidate, a first set of features obtained from respective morpheme information and syntactic information; and second feature calculating means for selecting a causal relation expression in each of the answer candidates relevant as giving an answer to the question, and for calculating a second set of features obtained from the causal relation expression. The set of features includes the first set of features and the second set of features.

According to the non-factoid question answering system, whether or not a causal relation expression in an answer candidate is relevant as plausible answer to the question is used as a second set of features. As the causal relation expression is taken into consideration in selecting an answer candidate, it becomes possible to reflect an relation between a question expression and a causal relation expression to the selection of an answer. As a result, a non-factoid question-answering system capable of giving appropriate answers to non-factoid questions, by appropriately handling various expressions of causal relations appearing in documents, can be provided.

Preferably, the candidate search means includes: classifying means, responsive to an input of the question, for classifying the question to any of a prescribed plurality of types; sentence dividing means, responsive to an input of the question, for dividing each of the documents stored in the document storage means to sets of sentences each consisting of one or more consecutive sentences and outputting the sets; and means for calculating, for each set of sentences output from the sentence dividing means, a score in accordance with a standard determined by a result of classification by the classifying means, and outputting a set of sentences having the highest score as the answer candidates.

More preferably, the second feature calculating means includes: clue expression specifying means for specifying, in each of the answer candidates, an expression serving as a clue for specifying a causal relation expression; causal relation expression specifying means for specifying a causal relation expression consisting of a cause part and a result part of the causal relation connected by a clue expression specified by the clue expression specifying means, in each of the answer candidates; match determining means for determining whether a combination of a noun and a polarity of a predicate on which the noun depends in a syntactically-parsed tree, included in the result part of the specified causal relation expression, matches a combination of a meaning of a noun and a polarity of a predicate on which the noun depends, included in the question; relevancy determining means for determining whether or not the causal relation expression specified by the causal relation expression specifying means in each of the answer candidates is relevant as an answer to the question, using a result of determination by the match determining means and word matching and dependency tree matching between each of the answer candidates and the question; and means for outputting, as features of the second feature set, information representing a result of determination by the relevancy determining means.

The second feature calculating means further includes means for outputting, as a set of the second features, an n-gram of a word of the causal relation expression specified by the causal relation specifying means, an n-gram of a sub-tree of the dependency tree in the causal relation, or a polarity of a predicate in the causal relation, or any combination of these.

The second feature calculating means may further include means for outputting, as a set of the second features, the number of words, sub-trees of dependency tree, pairs of a noun and a polarity of a predicate on which the noun depends in a syntactically-parsed tree shared by the question and a result part of the causal relation expression specified by the causal relation specifying means, or any combination of these.

According to a second aspect, a computer program in accordance with a second aspect of the present invention causes a computer to function as all the means of any of the non-factoid question-answering systems described above.

According to another aspect, the present invention provides a non-factoid question-answering method, receiving a non-factoid question and generating an answer to the question. This method is executed by using document storage means for storing a plurality of computer-readable documents. This method includes: the candidate search step, responsive to an input of a question, of taking out answer candidates to the question from the document storage means; the feature generation step, responsive to answer candidates searched at the candidate searching step, of generating, for combinations of the question and each of the answer candidates searched at the candidate searching step, a set of prescribed features; and the answer selection step of calculating, when a set of the features generated at the feature generating step is given, for the question and its answer candidate as a base for generating the set of features, a score representing a degree of plausibility of the answer candidate as a correct answer to the question, and outputting an answer candidate having the highest score as an answer to the question. The feature generation step includes: the first feature generation step for generating, for the question and each answer candidate, a first set of features obtained from respective morpheme information and syntactic information; and the second feature generation step for selecting a causal relation expression in each of the answer candidates relevant as giving an answer to the question, and for generating a second set of features obtained from the causal relation expression. The set of features includes the first set of features and the second set of features.

BRIEF DESCRIPTION OF DRAWINGS

FIG. 1 is a schematic block diagram of a non-factoid question-answering system in accordance with a first aspect of the present invention.

FIG. 2 is an illustration of n-grams obtained from a sub-tree of a dependency tree.

FIG. 3 shows variety types of causal relations.

FIG. 4 shows relevance of answers to a question.

FIG. 5 is a schematic illustration of a method for selecting answer candidates in the system shown in FIG. 1.

FIG. 6 shows an example of a list of answer candidates.

FIG. 7 shows a method of specifying a word as a clue of a causal relation in the answer candidates.

FIG. 9 is a block diagram showing a configuration of a causal relation recognizing unit of the system shown in FIG. 1.

FIG. 10 is a block diagram showing a configuration of a causal relation relevance determining unit shown in FIG. 1.

FIG. 11 is a block diagram showing a configuration of answer candidate ranking unit shown in FIG. 1.

FIG. 12 shows the same features as those used in the prior art, used in the first embodiment of the present invention.

DESCRIPTION OF EMBODIMENTS

Figure 8:
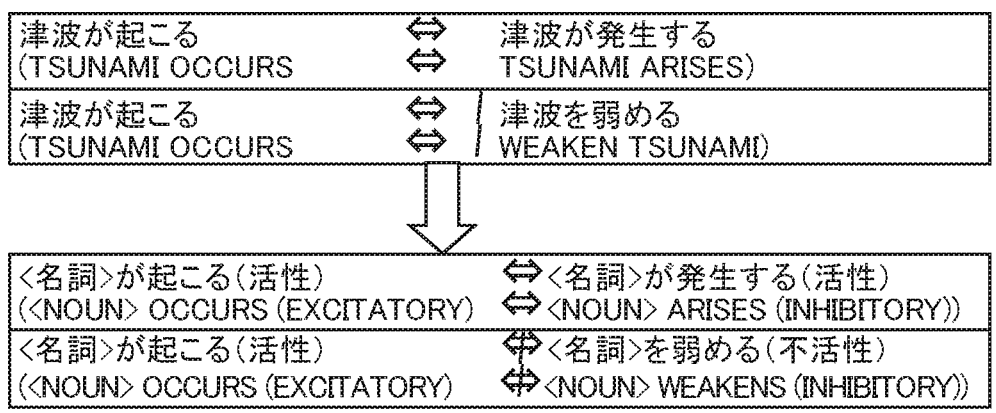
FIG. 8 illustrates an example of semantic polarities of excitation/inhibitory of predicates.

In the following description, the same components are denoted by the same reference characters. Therefore, detailed description thereof will not be repeated.

[Basic Concepts]

The inventors of the present invention noted that causal relation or semantic relation representing a cause and a result of a certain event, is useful when an answer to a non-factoid question is to be searched out from a huge amount of documents. From this point of view, causal relation expressions existing in texts prepared for searching an answer are recognized, and by supervised learning using appropriate features, an answer to the question is specified from the texts. Corresponding procedures are summarized below.

(1) Causal relations of various forms such as causal relations expressed by two noun phrases, ones expressed by a verb phrase and a clause in one sentence of each text, ones expressed over two or more continuous sentences and the like are recognized integrally. Details of the adopted method will be described later.

(2) It is often the case that a result part of a causal relation serves as an answer to the question. Further, it is often the case that a result part having relevancy as an answer to the question is semantically similar to the question. Paying attention to these tendencies, in the present embodiment, only the causal relations relevant as answers are taken out from a set of the causal relations obtained by the procedure (1) above. This method will also be described later. Particularly, this method is characterized in that by semantic polarity of "excitatory/inhibitory" of a predicate in the result part is used for recognizing an entailment relation, and in that this relation is used.

(3) By adopting features appropriately expressing causal relations obtained by the procedures (1) and (2), an answer or answers are specified by machine learning technique.

The procedures (1) and (2) described above are important to improve performance of why-type question-answering. The reason for this is that recognition of causal relations expressed in various forms from texts and selecting a causal relation relevant as an answer to the question from the causal relations directly leads to higher accuracy in extracting an answer or answers to why-type questions. Use of causal relations in various forms or use of entailment relation obtained by the semantic polarity of predicate has never been considered in the prior art.

In the present embodiment, answer candidates are collected from a huge amount of documents using existing information retrieval technique. Causal relations of various forms appearing in the collected answer candidates are integrally recognized, and by recognizing entailment relations based on the semantic polarity of "excitatory/inhibitory," information of causal relation relevant as an answer to the question is specified. As a result, a sentence that serves as an appropriate answer to the why-type question can effectively be identified. The specific procedures are as follows.

(A) By an existing information retrieval technique, a small number of sentences as answer candidates are specified from a huge amount of texts. Any technique may be used provided that it can collect documents considered to be related to the question.

(B) Thereafter, from these answer candidate texts, causal relations effective in generating an answer to the question are recognized in the following manner. The result part of each causal relation is expressed with appropriate features and used for supervised learning, whereby the result part as an answer candidate is evaluated. One having high evaluation is adopted as an answer. Specific process steps are as follows.

(B1) From the answer candidate texts, clue expressions (words/phrases) for a causal relation such as " . . . tame (ため, because)," " . . . node (ので, since)," " . . . karada (からだ, therefore)" and " . . . no gen'in ha (の原因は, cause of)" are found. Each of these expressions connects a cause part and a result part of a causal relation. Therefore, by extracting such clue expressions, it becomes possible to specify a cause part and a result part of the causal relation. By elaborating the clue expression, it becomes possible to specify not only causal relations each having a cause part and a result part appearing in one sentence but also those appearing in different sentences.

Referring to FIG. 3, typical forms of causal relation are as follows: 1) causal relation between noun phrases in a sentence; 2) causal relation between a noun phrase and a verb phrase in a sentence; 3) causal relation between a clause and a verb phrase in a sentence; and 4) causal relation appearing over two sentences.

In connection with the causal relation of the first type above, in the examples shown in FIG. 3, a noun phrase 80 of a cause and a noun phrase 82 of a result are connected by an expression 84 of "ga gen'in to naru (が原因となる, is a cause of)". In the second causal relation, a noun phrase 86 of a cause and a verb phrase 88 of a result are connected by an expression 90 of "ga gen'in de (が原因で, because of)". In the third causal relation, a cause part 92 of a clause and a result part 94 of a verb phrase are connected by an expression 96 of "tame (ため, and hence)." In the fourth example, a first sentence 102 of a cause and a verb phrase 100 in a second sentence of a result are connected by an expression 98 "ga gen'in de (が原因で, this is a cause of)."

Specifically, it can be seen that cause and result parts of each causal relation are connected by specific clue expressions.

(B2) From the causal relations obtained at (B1) above, those not relevant as answers to why-type question are discarded. Here, focusing on the fact that a result part of causal relation and a why-type question have semantic similarity, whether or not a result part of causal relation is relevant as an answer to a why-type question is determined through 1) word matching, 2) sub-tree matching of syntactically parsed result (dependency tree) and 3) entailment relation matching, recognized by semantic polarity of excitatory/inhibitory of a predicate.

Referring to FIG. 4, assume that the question is "naze tsunami ga okoru no desuka (なぜ津波が起こるのですか, Why does a tsunami occur)?" Two answer candidates shown in FIG. 4 both represent causal relations, and cause parts 92 and 110 are respectively connected to result parts 94 and 112 by expressions 96 and 114 of "tame (ため, and hence)," which is a clue expression of causal relation. It is noted, however, that the first candidate is relevant but the second is not relevant as an answer. The reason for this is that the expression "tsunami ga hassei shimasu (津波が発生します, tsunami arises)" of the result part 94 of the first example and the expression in the question "tsunami ga okoru (津波が起こる, tsunami occurs)" represent similar meanings, whereas the expression "tsunami wo yowameru kouka ga aru (津波を弱める効果がある, effective to weaken tsunami)" of the result part of the second example represents a meaning opposite to the expression of question. In the embodiment, it is necessary to represent such a difference appropriately as features.

(B3) From the causal relations obtained through (B1) and (B2) above, features for supervised learning to specify an answer or answers are formed. Here, 1) presence/absence of causal relation in answer candidates, 2) contents of causal relation represented by n-gram or the like, and 3) the number of words, sub-trees and entailment relations shared by the question and a result part of each causal relation are used as features. Finally, an answer is specified by a supervised learning method with these features.

By utilizing causal relation information considered to be relevant as an answer to the question while recognizing various forms of causal relation, it becomes possible to specify an answer to a why-type question with higher accuracy.

[Configuration]

Referring to FIG. 1, a question-answering system 30 in accordance with the present embodiment receives a non-factoid question 34 such as a why-type question, extracts causal relation expressions having result parts relevant as answers to the question 34 from an object document storage unit 32 storing a huge amount of documents as an object of search for an answer, and outputs the extracted expressions as answers 36. In the present embodiment, for easier understanding of the following description, it is assumed that object document storage unit 32 stores documents in which each sentence is divided to a sequence of morphemes and subjected to syntactic-dependency analysis, and has a result of syntactic-dependency analysis appended thereto.

Question-answering system 30 includes: a morphological analysis unit 50 receiving question 34 and performing morphological analysis; and a dependency analysis unit 52, parsing syntactic-dependency on a sequence of morphemes output from morphological analysis unit 50 and outputting a dependency tree 201. The dependency tree 201 output from dependency analysis unit 52 is used as a feature in machine learning for specifying an answer.

One feature obtained from dependency tree 201 is an n-gram of a sub-tree. This will be described with reference to FIG. 2. Now, assume that dependency tree 201 includes a sub-tree 70. Sub-tree 70 has four nodes A, B, C and D. Of these words, assume that D represents an important word for the causal relation. Here, possible n-grams generated from sub-tree 70 include a tri-gram 72 consisting of a sub-tree (B1) of FIG. 2 and a bi-gram 74 consisting of a sub-tree (B2) of FIG. 2. If there is a node E (not shown) following node D, tri-grams of B-D-E and C-D-E can also be used as features. The foregoing is a brief description of the n-grams obtained from a sub-tree. It is noted that the n-grams are not limited to tri-grams or bi-grams.

Again referring to FIG. 1, question-answering system 30 further includes: a related document searching unit 54 searching and extracting documents considered to be related to question 34 from object document storage unit 32, by an existing information retrieval technique, using the dependency tree output from dependency analysis unit 52 and the information obtained from question 34; and an answer candidate extracting unit 56 extracting a plurality of answer candidate 202 from the documents extracted by related document searching unit 54, also by an existing technique.

Various existing method may be used for the document search by related document searching unit 54. By way of example, a method of document search using a content word extracted from the question as a keyword may be applied.

Alternatively, a technique of extracting documents related to a question described in Chapter 3, Section 2 of Non-Patent Literatures 1 may be used. In the present embodiment, open source software called Solr (http://lucene-.apache.org/solr/) was used.

Answer candidate extracting unit 56 extracts answer candidates each consisting of a set of five consecutive sentences, from the sentences contained in the documents searched by related document searching unit 54. As shown in FIG. 5, answer candidate extracting unit 56 extracts a plurality of sets each including five sentences, as represented by the first set 120 of five sentences, the second set 122 of five sentences, . . . the second to last set 130 of five sentences and the last set 132 of five sentences.

Of these sets of five sentences, adjacent two sets share four sentences. For example, the first set 120 of five sentences and the second set 122 of five sentences share the second to fifth sentences. The reason why five sentences are handled as one set is that a cause part and a result part of causal relation may possibly exist in separate sentences. In the present embodiment, answer candidate extracting unit 56 further evaluates a large number of sets of five sentences obtained from each document by comparing them with the question 34, and selects sets of five sentences that are most plausible as answer candidates. In the present embodiment, 20 sets are selected. Again, various methods may be used for extracting the answer candidates. In the present embodiment, the technique described in Non-Patent Literature 1 is used.

The method described in Non-Patent Literature 1 is, briefly, as follows. First, a non-factoid question is classified to any of six types. The six types are as follows.

(1) Question related to a definition: asks a definition of something.

(2) Question related to a reason: asks a reason for something.

(3) Question related to a method: asks a description of a method.

(4) Question related to a degree: asks a description related to a degree of something.

(5) Question related to a change: asks a description of something that has changed.

(6) Question related to details: asks details of a series of events.

The classification is done based on whether or not a question sentence includes an interrogative word, a specific adjective or adverb. By way of example, if a question sentence includes "(なぜ, why)", it is determined that the question asks for a reason.

Next, from the answer candidates, answer candidates including a specific language determined corresponding to the type of question and a word contained in the question are extracted. Here, in the present embodiment, a score of each answer candidate is calculated, and top candidates are selected in accordance with the scores. Details of the method of calculating scores are described in Non-Patent Literature 1. In short, any such score calculation method may be used that puts high score on an answer candidate that contains, of the words contained in the question, ones that rarely appears in the whole documents as the object. FIG. 6 shows examples of answer candidates extracted by answer candidate extracting unit 56.

Again referring to FIG. 1, question-answering system 30 further includes: a causal relation recognizing unit 60 specifying a causal relation expression included in each of the top answer candidates 202 extracted by answer candidate extracting unit 55 and outputting answer candidates 204 each having tags attached to a cause part and result part of causal relation; a clue word storage unit 58 storing clues for causal relation, looked up by causal relation recognizing unit 60 when specifying causal relation in answer candidates; and a causal relation relevance determining unit 64, determining, for each of the causal relations (if any) found in each of the answer candidates by causal relation recognizing unit 60, whether or not the causal relation is relevant as an answer to question 34 (causal relation relevancy), and outputting answer candidates each having a relevancy flag attached to indicate relevance of the causal relation.

Question-answering system 30 further includes: a polarity dictionary storage unit 62 storing polarities of predicates used by causal relation relevancy determining unit 64 when determining relevancy of causal relation; a feature vector generating unit 66 generating a prescribed feature vector 300 for each answer candidate, using information obtained by various processing units up to causal relation relevancy determining unit 64 for each answer candidate and for the question; and an answer candidate ranking unit 68 scoring each answer candidate using the feature vector 300 generated for each answer candidate by feature vector generating unit 66 and a model trained beforehand by machine learning, ranking the candidates accordingly and outputting the answer candidate at the top as an answer 36 to the question 34.

The clue words of causal relation stored in clue word storage unit 58 shown in FIG. 1 include, for example, " . . . tame (ため, hence)," " . . . node (ので, because)," " . . . riyuuha (理由は, reason for)," " . . . gen'in to naru (原因となる, is a cause of)", " . . . (ことから, therefore)," " . . . kotode, (ことで, because of)," " . . . karada (か らだ, due to)." In the present embodiment, as clue words, 251 expressions of words (phrases) are manually collected and stored in the causal relation clue word storage unit 58. By way of example, the word 160 of " . . . tame (ため, hence)" in answer candidate 1 and the word 162 of " . . . tame (ため, hence)" of answer candidate 2 shown in FIG. 7 are both clue words.

Causal relation recognizing unit 60 searches for causal relation clue words in answer candidates, and if any clue word is found, specifies a cause part and a result part of the causal relation expression connected by the word. Here, for specifying, a CRF (Conditional Random Fields) model trained in advance by machine learning is used.

Referring to FIG. 9, causal relation recognizing unit 60 includes: a clue word specifying unit 220 specifying, in each input answer candidate, any word stored in causal relation clue word storage unit 58; a CRF model 222 trained in advance to specify a cause part and a result part of the causal relation expression connected by the word, once the clue word is specified in the answer candidate; and a causal relation expression specifying unit 224, adding tags indicating start and end positions of a cause part and tags indicating start and end positions of a result part of the causal relation expression connected by the clue word to each answer candidate by looking up CRF model 222 using the clue word specified by clue word specifying unit 220 and the answer candidate, and outputting the answer candidate as answer candidate 204.

As described above, CRF model 222 is pre-learned such that when a clue word and an answer candidate are given, a cause part and a result part of the causal relation expression represented by the clue word are specified. Referring to FIG. 9, a learning unit 200 of CRF model 222 is a device independent of question-answering system 30, and it includes: a training text storage unit 230 storing training texts; a labeling unit 232 for generating training data by manually labeling a cause part and a result part for each clue word found in the training text based on the clue words stored in causal relation clue word storage unit 58; training data storage unit 234 storing training data output from labeling unit 232; and a machine learning unit 236 realizing learning of CRF model 222 using the training data stored in training data storage unit 234.

Causal relation relevancy determining unit 64 compares a description of result part extracted from each answer candidate with the question sentence and determines whether the result part of the answer candidate (hereinafter simply referred to as "result part") is relevant as an answer to the question, as will be described later.

As already described with reference to FIG. 4, not all the causal relations recognized in the answer candidates are relevant as answers to the question. Causal relation expressions relevant as the answers to the question tend to have result parts similar to the question. Therefore, in the present embodiment, whether or not a causal relation expression is relevant as an answer to the question is determined using (1) word matching and (2) sub-tree matching, between the question and the result part.

(1) Word Matching

Word matching relates to how many content words (including nouns and verbs) are shared by the question and the result part. The larger the number of shared content words, the more similar the question and the result part.

(2) Sub-tree Matching

Sub-tree matching is matching of sub-trees in syntactic structures. Specifically, in regard of sub-trees such as shown in (B1) and (B2) of FIG. 2, how many sub-trees in a question are common to sub-trees in the result part is determined. More specifically, to what extent the word n-grams obtained from the two sub-trees are common is found.

The determination as to whether the causal relation is relevant as one providing an answer to the question is sometimes difficult when only the word matching and the sub-tree matching are used. In the example of FIG. 4, though the causal relations have common clue word and common content words, one is relevant as providing an answer to the question but the other is not. Specifically, in the examples shown in FIG. 4, the expression "tsunami ga okuru (津波が起こる, tsunami occurs)" in the question and the expression "tsunami ga hassei shimasu (津波が発生します, tsunami arises)" in the sentence presented as an "answer" can be considered to have an entailment relation, since when "tsunami ga hassei shimasu (津波が発生します, tsunami arises)" it always means "tsunami ga okuru (津波が起こる, tsunami occurs)." In contrast, the expression "tsunami ga okuru (津波が起こる, tsunami occurs)" in the question and the expression "tsunami wo yowameru (津波を弱める, to weaken tsunami)" in the sentence presented "not as an answer" do not have the entailment relation. Though the former is relevant as an answer, the latter is not.

In order to determine whether an answer candidate is relevant as an answer to the question, it is necessary to recognize presence/absence of an entailment relation between the expression in the question and the expression in the answer candidate. This, however, is a difficult task. Therefore, in the present embodiment, the entailment relation is recognized using a concept of "polarity" of a predicate. As described in the foregoing, we consider two polarities of predicates, that is, "excitatory" and "inhibitory." That the polarity of a predicate is "excitatory" means that an expression pattern containing the predicate and a variable X as an argument of the predicate entails that a function, effect, purpose, or role of the argument X's referent is activated or enhanced. Example may include "X wo hikiokosu (X を引き起こす, cause X)," "X wo tukau (X を使う, use X)," "X wo kau (X を買う, buy X)," "X wo sinkou saseru (X を進行させる, promote X)," "X wo yunyu suru (X を輸入する, import X)" and "X ga fueru (X が増える, X increases)." That the polarity of a predicate is "inhibitory" means that an expression pattern containing the predicate and a variable X as an argument of the predicate entails that a function, effect, purpose, or role of the argument X's referent is deactivated or suppressed. Examples may include "X wo fusegu (X を防ぐ, prevent X)," "X wo suteru (X を捨てる, dispose X)," "X ga heru (X が減る, X decreases)," "X wo hakai suru (X を破壊する, destroy X)," and "X ga fukanou ni naru (X が不可能になる, X becomes impossible)."

Referring to FIG. 8, in the example of FIG. 4, the expression "tsunami ga okoru (津波が起こる, tsunami occurs)" (noun+occurs) and the expression "tsunami ga hassei shimasu (津波が発生します, tsunami arises)" (noun+arises) are common in that both have the noun "tsunami" and that the predicates corresponding to "tsunami" (occurs, arises) have excitation polarities. On the other hand, the expression "tsunami ga okoru (津波が起こる, tsunami occurs)" (noun+occurs) and the expression "tsunami wo yowameru (津波を弱める, to weaken tsunami)" (noun+weaken) are common in that both have the noun "tsunami" but they are different as the former predicate "okoru (起こる, occurs)" is excitatory and the latter "yowameru (弱める, weaken)" is inhibitory. In this manner, the predicate polarity is classified into excitatory/inhibitory based on its meaning, and only when a combination of a noun and the polarity of a predicate on which the noun depends of the question sentence matches a combination of a noun and the polarity of a predicate on which the noun depends of a result part, the matched pair is recognized as representing an entailment relation. Using this nature, it is possible to determine whether the causal relation is relevant as an answer to the question.

Using such a technique, causal relation relevancy determining unit 64 shown in FIG. 1 determines whether or not a causal relation in each answer candidate is relevant as an answer to the question.

Referring to FIG. 10, causal relation relevancy determining unit 64 includes: a predicate polarity determining unit 270 determining polarity of a predicate included in a result part of a detected causal relation expression, using the polarity dictionary stored in polarity dictionary storage unit 62, for each of the answer candidates 204 output from causal relation recognizing unit 60; a match determining unit 272 determining whether or not a combination of a noun and the polarity of a predicate on which the noun depends of a result part matches a combination of a noun and the polarity of a predicate on which the noun depends of the question sentence, using the polarity determined by predicate polarity determining unit 270; and a relevancy flag setting unit 274, setting or resetting a relevancy flag indicating whether or not a causal relation in an answer candidate is relevant as an answer to the question, attaching the flag to the answer candidate and outputting it as an answer candidate 260, in accordance with the results of word matching and sub-tree matching between the question and the result part of the answer candidate and the determination result by the match determining unit 272.

Referring to FIG. 11, answer candidate ranking unit 68 includes: a scoring unit 302 evaluating a feature vector 300 generated by feature vector generating unit 66 by a pre-trained SVM (Support Vector Machine), and outputting a score indicating plausibility as an answer to the question; a score storage unit 304 storing, with each candidate, the score output for each candidate; and a top candidate output unit 306, sorting all the answer candidates stored in score storage unit 304 in descending order of the scores and outputting the result part of the causal relation corresponding to the answer candidate having the highest score as an answer 36 to the question.

Of a list of features generated by feature vector generating unit 66, those not directly related to the present invention are shown as a list in FIG. 12. These features are used in the system described in Non-Patent Literature 3. Specifically, features as elements of feature vector generated by feature vector generating unit 66 are divided to two sets, that is, a set of features calculated from the results of morphological analysis and syntactic dependency analysis of the prior art, as described in Non-Patent Literature 3, and a set of features calculated with regard to the causal relation as will be described in the following.

In the present embodiment, the following elements are used as features of a set different from those shown in FIG. 12.

(1) Presence/Absence of Causal Relation

A binary indicator for whether or not an answer candidate includes a causal relation determined to be relevant as an answer. This value is obtained from the output of causal relation relevancy determining unit 64.

(2) Contents of Causal Relation

Of the causal relation found in an answer candidate, n-grams of words, n-grams of sub-tree, and semantic polarity of excitatory/inhibitory of a predicate. These can be obtained from the sequence of morphemes of answer candidate, syntactic dependency tree, and predicate polarity determining unit 270 (FIG. 10) in the output of causal relation relevancy determining unit 64.

(3) Confidence in Causal Relation

The number of words, sub-trees or excitatory/inhibitory polarities shared by the question and the result part of a causal relation expression determined to be plausible as an answer, or arbitrary combination of these. These can be generated from the outputs of morphological analysis unit 50 and dependency analysis unit 52, outputs of causal relation recognizing unit 60, the sequence of morphemes and sub-trees of each answer candidate.

Learning of scoring unit 302 is conducted in the following manner.

Referring to the right side of FIG. 11, a learning unit 290 of scoring unit 302 is prepared separate from learning unit 200 of question-answering system 30. Learning unit 290 includes a training document storage unit 310 storing documents for training. The documents for training include a plurality of training data sets. Each training data set contains a question and a plurality of sentences representing causal relations serving as answer candidates to the question. Each sentence has a label attached, indicating whether or not the result part of the causal relation expression included in the sentence is to be used as an answer to the question of the same training data set.

Learning unit 290 further includes: a feature vector generating unit 312, calculating, for each causal relation of each training data set stored in training document storage unit 310, the same features as feature vector generating unit 66 by executing the same process as question-answering system 30, and thereby generating and outputting feature vectors for SVM learning; a training data storage unit 314 storing training data including feature vectors for training output from feature vector generating unit 312; and an SVM learning unit 316 realizing learning process of SVM in scoring unit 302, using the training data stored in training data storage unit 314.

Scoring unit 302 shown in FIG. 11 is trained using the same features as the actual question-answering system and, therefore, when a feature vector obtained from each answer candidate is given, scoring unit 302 is ready to output, as a score, how appropriate the answer candidate is as an answer.

[Operation]

Question-answering system 30 having the above-described configuration operates in the following manner. First, the operation of question-answering system 30 in a preparation stage for the operation of question-answering system 30 will be described. Referring to FIG. 1, a large number of documents as objects of search for answers are stored in advance in object document storage unit 32. Each of the sentences in each document is subjected to morphological analysis and dependency analysis, and information of dependency tree is added thereto.

In causal relation clue word storage unit 58, clue words (or phrases) as expressions used for specifying a cause part and a result part of causal relation expressions are stored in advance. Further, in polarity dictionary storage unit 62, a polarity dictionary describing polarity (excitatory/inhibitory) of each of a large number of predicates is stored.

Referring to FIG. 9, in a training text storage unit 230 of learning unit 200, training texts are stored in advance. Using labeling unit 232, to each of the texts, labels indicating a position of a clue word stored in causal relation clue word storage unit 58 and ranges of a cause part and a result part of the causal relation expression connected by the clue word are manually added. Sentences having the labels added are stored as training data in training data storage unit 234. Machine learning unit 236 conducts learning of CRF model 222 using the training data.

Referring to FIG. 11, in learning unit 290 of scoring unit 302, a plurality of training data sets are stored in training document storage unit 310. Each training data set includes a question and a plurality of sentences representing causal relations serving as answer candidates to the question. Each sentence has a label indicating whether or not the result part of the causal relation included in the sentence is to be the answer to the question of the same training data set. Feature vector generating unit 312 of learning unit 290 calculates the same features as feature vector generating unit 66 by conducting similar process as question-answering system 30 for each causal relation of each training data set stored in training document storage unit 310, and adds a label, whereby training feature vectors are generated and output to training data storage unit 314. Training data storage unit 314 stores training data including feature vectors for learning, output from feature vector generating unit 312. SVM learning unit 316 performs learning process of SVM of scoring unit 302, using the training data stored in training data storage unit 314. As a result, when a feature vector obtained from each answer candidate is given, scoring unit 302 is ready to output, as a score, how appropriate the answer candidate is as an answer. In this manner, question-answering system is made capable of outputting an appropriate answer 36 to the question 34.

Referring to FIG. 1, when question 34 is given to question-answering system 30, morphological analysis unit 50 performs morphological analysis on question 34, and dependency analysis unit 52 performs dependency analysis of the question and adds a dependency tree to question 34, which is output to related document searching unit 54.

Related document searching unit 54 searches object document storage unit 32 for documents considered to be related to question 34 and extracts such documents, using information provided by dependency analysis unit 52.

Answer candidate extracting unit 56 generates a large number of answer candidates 202 as sets each including five sentences, as described with reference to FIG. 5, from each of the documents extracted by related document searching unit 54. Answer candidate extracting unit 56 further selects, from the extracted answer candidates 202, answer candidates 202 considered to be related to question 34.

Thereafter, causal relation recognizing unit 60 operates in the following manner. Referring to FIG. 9, clue word specifying unit 220 determines, for each answer candidate 202, whether or not it has any clue word stored in causal relation clue word storage unit 58. If an answer candidate does not have any clue word, the candidate is discarded, and only the answer candidates having a clue word are given to causal relation expression specifying unit 224.

Causal relation expression specifying unit 224 estimates, for each of the answer candidates given from clue word specifying unit 220, a cause part and a result part of a causal relation expression connected by the clue word, using CRF model 222, adds tags indicating respective start position and end position, and outputs the results as answer candidates 204.

Referring to FIG. 10, receiving the answer candidates 204, predicate polarity determining unit 270 of causal relation relevancy determining unit 64 determines polarity of the predicate in the result part of causal relation expression included in each answer candidate 204 by looking up polarity dictionary storage unit 62, and outputs the answer candidates 204 having the determination added, to match determining unit 272. Match determining unit 272 determines whether or not a combination of a noun and the polarity of a predicate on which the noun depends of the result part matches a combination of a noun and the polarity of a predicate on which the noun depends of the question, and outputs the result. Relevancy flag setting unit 274 sets or resets the relevancy flag in accordance with the output of match determining unit 272, results of word matching and sub-tree matching between the question and the result part of each answer candidate, adds the flag to the answer candidates and outputs the results as answer candidates 260.

Feature vector generating unit 66 shown in FIG. 1 generates, based on various pieces of information added to answer candidates 260, feature vectors to be used by scoring unit 302 of answer candidate ranking unit 68 and applies these to scoring unit 302.

Scoring unit 302 shown in FIG. 11 calculates scores of given feature vectors, using pre-trained SVM by learning unit 290. Score storage unit 304 stores scores calculated for respective answer candidates, with the answer candidates. When calculation of scores for all answer candidates is completed, top candidate output unit 306 selects an answer candidate having the highest score, and outputs it as answer 36.

[Experiment]

In order to study influence of causal relation features in the why-type question answering system, accuracy of the top answer obtained by various methods to the question was studied. The results are as shown in Table 1 below.

TABLE 1

| Technique | Accuracy of top answers |
| --- | --- |
| Non-Patent Literature 1 | 22.2 |
| Non-Patent Literature 3 | 37.4 |
| with causal relation features only | 27.8 |
| Non-patent literature 3 + causal relation | 41.8 |

The method of Non-Patent Literature 1 corresponds to the technique used by answer candidate extracting unit 56 of the above-described embodiment. Non-Patent Literature 3 attained the highest accuracy among the prior art techniques, and cited here for a comparison with the present embodiment of the invention.

From the results above, it is understood that the accuracy of the top answer candidate attained by the method of the embodiment above (in which answer candidates are ranked using the causal relation features in addition to the features of Non-Patent Literature 3) was considerably higher than the highest accuracy of the prior art (Non-Patent Literature 3).

Figure 13:
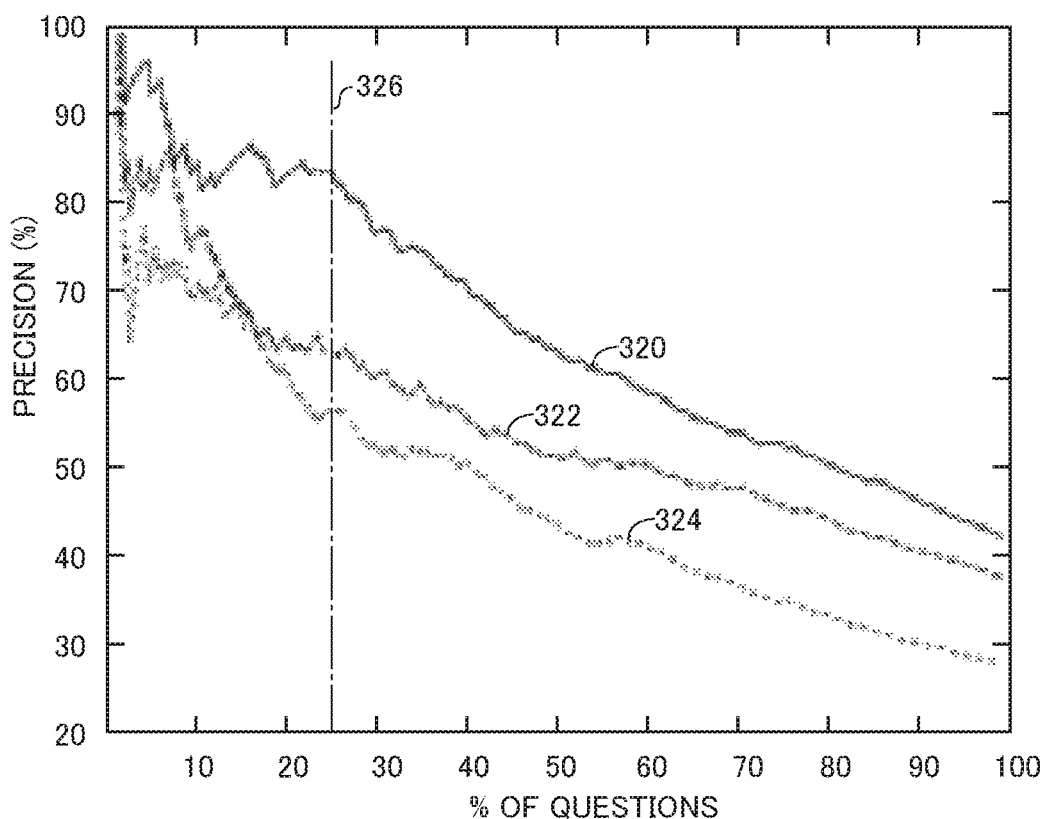
FIG. 13 is a graph showing effects attained by the embodiment of the present invention.

Further, in order to study reliability of answers obtained by the technique of the embodiment above and the technique in accordance with Non-Patent Literature 3, the top answer of all the questions is arranged in the order of answer scores given by the above techniques, and the answer accuracy in the arrangement was studied. FIG. 13 shows the results.

Referring to FIG. 13, it can be seen from the values of each rank (graph 322) of the answer accuracy obtained by the technique of Non-Patent Literature 3 that the answer accuracy at the point of 25% of questions of which the score of the top answer is in the highest 25% among that of the top answer of all the questions (represented by chain-dotted line 326 in FIG. 13) was 62%. In contrast, the value of the technique in accordance with the above-described embodiment (graph 320) was 83%. For reference, FIG. 13 also shows a graph 324 representing an example using only the causal relation for ranking.

As described above, according to the embodiment above, in addition to the conventionally used features for ranking the answer candidates, causal relation features are used and thereby accuracy of answers to non-factoid questions can significantly be improved. Therefore, a question-answering system providing appropriate answers to non-factoid questions by using such causal relation features as described above can be provided.

[Computer Implementation]

Figure 14:
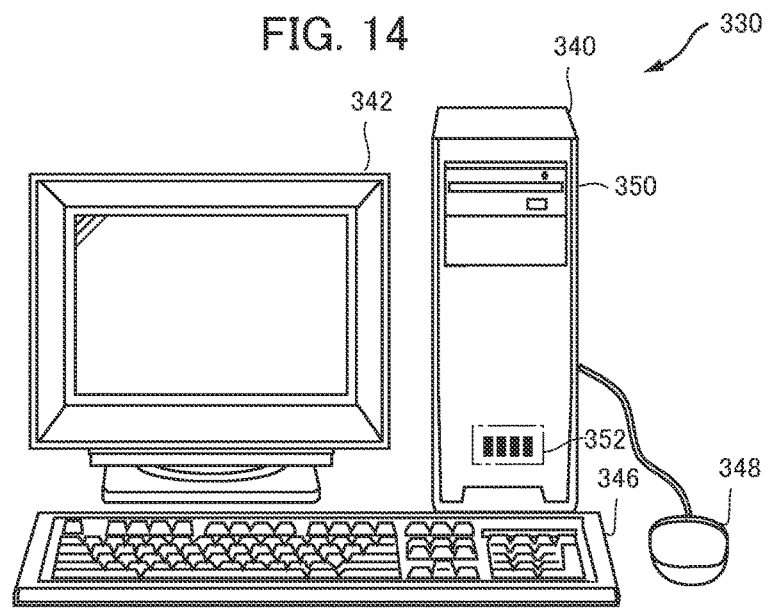
FIG. 14 is a schematic diagram showing an appearance of a computer for implementing the question-answering system in accordance with the first embodiment of the present invention.

Question-answering system 30 in accordance with the embodiment above can be implemented by computer hardware and the above-described computer program running on the computer hardware. FIG. 14 shows an appearance of computer system 330 and FIG. 15 shows an internal configuration of computer system 330.

Referring to FIG. 14, computer system 330 includes a computer 340 having a memory port 352 and a DVD (Digital Versatile Disc) drive 350, a keyboard 346, a mouse 348 and a monitor 342.

Figure 15:
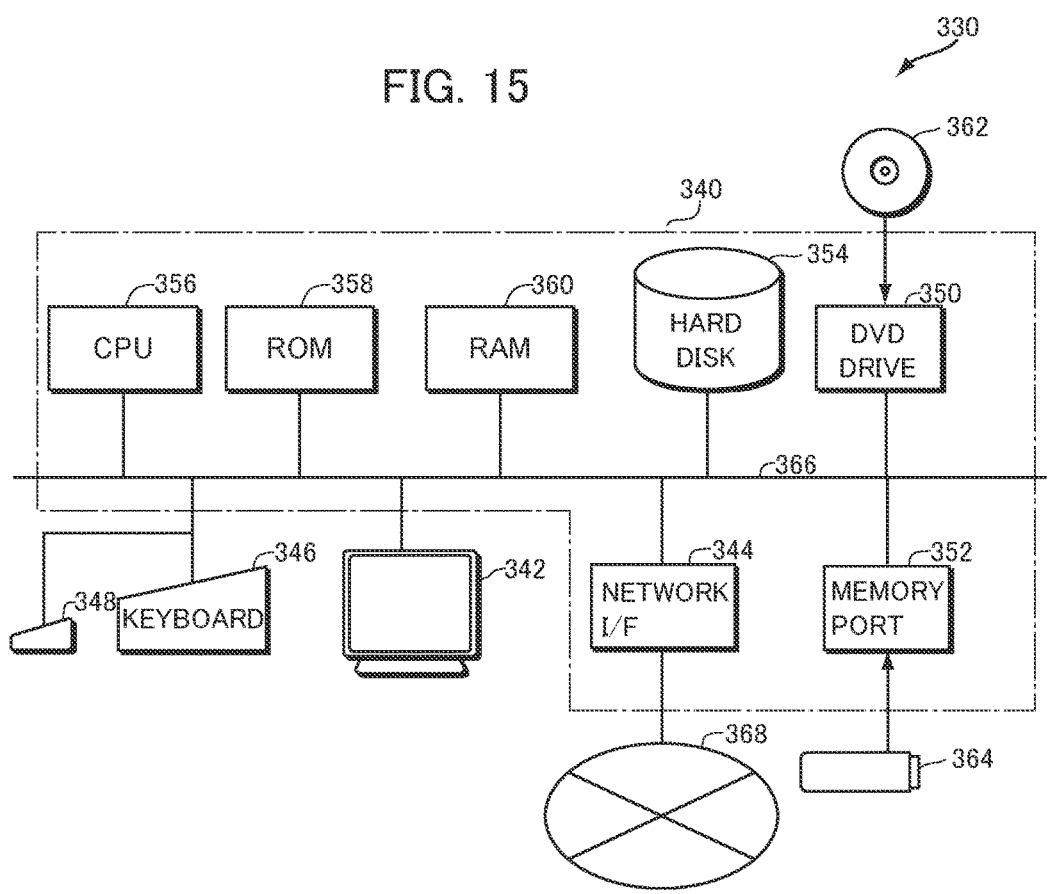
FIG. 15 is a block diagram showing hardware configuration of the computer shown in FIG. 14.

Referring to FIG. 15, in addition to memory port 352 and DVD drive 350, computer 340 includes a CPU (Central Processing Unit) 356, a bus 366 connected to CPU 356, memory port 352 and DVD drive 350, a read only memory (ROM) 358 for storing a boot program and the like, a random access memory (RAM) 360 connected to bus 366 and storing program instructions, a system program and work data, and a hard disk 354. Computer system 330 further includes a network interface (UF) 344 providing a connection to a network 368, enabling communication with other terminals.

The computer program causing computer system 330 to function as various functional units of question-answering system 30 in accordance with the above-described embodiment is stored in a DVD 362 or removable memory 364 loaded to DVD drive 350 or memory port 352, and transferred to hard disk 354. Alternatively, the program may be transmitted to computer 340 through network 368 and stored in hard disk 354. The program is loaded to RAM 360 at the time of execution. The program may be directly loaded to RAM 360 from removable memory 364, or through network 368.

The program includes a sequence of instructions consisting of a plurality of instructions causing computer 340 to function as various functional units of question-answering system 30 in accordance with the embodiment above. Some of the basic functions necessary to cause computer 340 to operate in this manner may be provided by the operating system running on computer 340, by a third-party program, or various programming tool kits or program library installed in computer 340. Therefore, the program itself may not include all functions to realize the system and method of the present embodiment. The program may include only the instructions that call appropriate functions or appropriate program tools in the programming tool kits in a controlled manner to attain a desired result and thereby to realize the functions of the system described above. Naturally the program itself may provide all necessary functions.

In the embodiment above, object document storage unit 32, causal relation clue word storage unit 58, polarity dictionary storage unit 62, training text storage unit 230, training data storage units 234 and 314, CRF model 222, training document storage unit 310, score storage unit 304 and the like are realized by RAM 360 or hard disk 354. Values therein may further be stored in removable memory 364 such as a USB memory, or may be transmitted to another computer through a communication medium such as a network.

The system in accordance with the embodiment above may be used as one module incorporated in an existing speech-based question-answering system. The system of the above embodiment may be used to specify an answer with high accuracy from texts on the Web, for example, when a non-factoid question is given as an input. The use of the system above is not limited to the question-answering system, and it may be used to provide useful information to users as a module of a search engine or an information analyzing system.

In the embodiment above, open source software Solr is used in related document searching unit 54 shown in FIG. 1. The present invention, however, is not limited to such an embodiment. By way of example, a method using a causal relation appearing in a document as a clue may be adopted, or a method using a combination of a causal relation appearing in a document and excitatory/inhibitory of a predicate appearing in the causal relation as a clue may be adopted. Generally, a method may be used in which a question and documents are expressed in the form of multi-dimensional vectors using words contained therein, a document including contents similar to the question is searched by calculating degree of similarity between the vectors, and answer candidates are narrowed down using the causal relation as described above as a clue. There are many paid-and charge-free software tools for searching documents related to a question. Here, it is necessary to provide an answer quickly and, therefore, not full-text search type software, in which each document is scanned from the start to the end after receiving a question, but indexing type software, in which pre-collected huge amount of documents are indexed, is preferred.

In the embodiment above, a why-type question is assumed as an example of a non-factoid question, and causal relation appearing in documents is used as a clue for obtaining answer candidates. The present invention, however, is not limited to such an embodiment. By way of example, consider a how-type question that also belongs to the non-factoid questions, such as "How do you make stuffed sweet peppers?" For this type of question, in order to find answer candidates, material relation such as "You use minced pork or spam, and egg for stuffed sweet peppers" or process relation such as "Cut top off the peppers and remove seeds" may be used as clues.

In the embodiment above, whether the combination of a noun and a predicate polarity appearing in the question and the combination of a noun and a predicate polarity appearing in the answer candidate match or not is used for selecting an answer, and as the polarity, whether a polarity of the predicate is excitatory or not (for an expression pattern containing the predicate and a variable X as an argument of the predicate entails that a function, effect, purpose, or role of the argument X's referent is activated or enhanced) is used. The present invention, however, is not limited to such an embodiment. A different polarity may be used. By way of example, "good/bad" may be used as the polarity. Consider a disease. In an expression "byouki ga hidoku naru (病気がひどくなる, disease worsens)," "hidoku naru (ひどくなる, worsens)" is "excitatory" when considered from the viewpoint of excitatory/inhibitory polarity, whereas it is "bad" from the viewpoint of "good/bad." In this manner, not only excitatory/inhibitory but other nature may be used as the polarity of predicates. Further, taking the example above, a combination of different polarities, such as "hidoku naru (ひどくなる, worsens)" is "excitatory" and "bad" may be used as features for selecting an answer.

Further, in the embodiment above, for easier understanding, examples in which both the question and the result parts have only one combination of "noun+predicate" are described. The present invention, however, is not limited to such an embodiment. For example, in an expression "tabako ga ganwo hikiokosu (タバコがガンを引き起こす, tobacco causes cancer)," two combinations of "noun+predicate," that is, "tabako ga hikiokosu (タバコが引き起こす, tabako causes)" and "ganwo hikiokosu (ガンを引き起こす, causes cancer)" are obtained. Of these, only a specific one may be used (for example, only the one in which the noun is a subject of the predicate may be used, or one in which the noun is an object may be used, or only the one in which the relation between the noun and the predicate corresponds to that of the question may be used), or all may be used, for generating features.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The present invention is applicable to a question-answering service providing an answer to a non-factoid question such as a so-called why-type question using a computer and a network, as well as to apparatuses used for such a service.

REFERENCE SIGNS LIST 30 question-answering system
32 object document storage unit
34 question
36 answer
50 morphological analysis unit
52 dependency analysis unit
54 related document searching unit
56 answer candidate extracting unit
58 causal relation clue word storage unit
60 causal relation recognizing unit
62 polarity dictionary storage unit
64 causal relation relevancy determining unit
66 feature vector generating unit
68 answer candidate ranking unit
200 learning unit
201 dependency tree
202, 204, 206 answer candidates
220 clue word specifying unit
222 CRF model
224 causal relation expression specifying unit
270 predicate polarity determining unit
272 match determining unit
274 relevancy flag setting unit
300 feature vector
302 scoring unit
306 top candidate output unit

The invention claimed is:

1. A non-factoid question-answering system connected to a document storage for storing a plurality of computer-readable documents, the system comprising:
a processor configured to:
receive a non-factoid question as an input;
responsive to the question, retrieve answer candidates to the question from said document storage;
create question and answer candidates comprising combinations of said question and each of the answer candidates;
for each question and answer candidate, generate a set of prescribed features comprising:
calculating a first set of features obtained from respective morpheme information and syntactic information;
in the answer of the question and answer candidate, selecting a causal relation expression based on a matching relationship; and
calculating a second set of features obtained from said selected causal relation expression based on a polarity of the selected causal relation expression, wherein said set of prescribed features includes said first set of features and said second set of features;
for the set of prescribed features and the question and the answer candidate used as a base for generating the set of features, calculate a score representing a degree of plausibility of the answer candidate as a correct answer to the question;
output an answer candidate having the highest score as an answer to the question;
specify, in each of said answer candidates, an expression serving as a clue for specifying a casual relation expression;
specify a causal relation expression consisting of a cause part and a result part of causal relation connected by a specified clue expression, in each of said answer candidates;
determine whether a combination of a noun and a polarity of a predicate on which the noun depends, included in the result part of said specified causal relation expression, matches a combination of a noun and a polarity of a predicate on which the noun depends, included in the question;
determine a relevance of the specified causal relation expression in each of said answer candidates based on word matching and dependency tree matching between each of said answer candidates and said question, and
output, as features of said second feature set, information representing a result of the determination.

2. The non-factoid question-answering system according to claim 1, wherein the processor is further configured to:
responsive to an input of said question, classify the question to any of a prescribed plurality of types,
responsive to an input of said question, divide each of the documents stored in said document storage to sets of sentences each consisting of one or more consecutive sentences and outputting the sets, and
for each set of sentences output, calculate a score in accordance with a standard determined by a result of classification, and outputting a set of sentences having the highest score as said answer candidates.

3. The non-factoid question-answering system according to claim 1, wherein the processor is further configured to:
output, as a set of said second features, an n-gram of a word of the specified causal relation expression, an n-gram of a sub-tree of the dependency tree in the causal relation, or a combination of a polarity of a predicate in said causal relation and meaning of a noun depending on the predicate, or any combination of these.

4. The non-factoid question-answering system according to claim 1, wherein the processor is further configured to:
output, as a set of said second features, the number of words, sub-trees of dependency tree, pairs of a noun and polarities (excitatory/inhibitory) of predicates on which the noun depends on in a dependency tree, shared by said question and a result part of the specified causal relation expression, or any combination of these.

5. A non-factoid question-answering method performed by a processor and executed by using document storage for storing a plurality of computer-readable documents, the method comprising:
receive a non-factoid question as an input
responsive to the question, retrieve using the processor answer candidates to the question from said document storage;
using the processor, create question and answer candidates comprising combinations of said question and each of the answer candidates;
for each question and answer candidate, generate using the processor a set of prescribed features comprising:
calculating a first set of features obtained from respective morpheme information and syntactic information;
in the answer of the question and answer candidate, selecting a causal relation expression based on a matching relationship; and
calculating a second set of features obtained from said selected causal relation expression based on a polarity of the selected causal relation expression, wherein said set of prescribed features includes said first set of features and said second set of features;
for the set of prescribed features and the question and the answer candidate used as a base for generating the set of features, calculate a score representing a degree of plausibility of the answer candidate as a correct answer to the question;
output an answer candidate having the highest score as an answer to the question;
specify, in each of said answer candidates, an expression serving as a clue for specifying a causal relation expression;
specify a causal relation expression consisting of a cause part and a result part of causal relation connected by a specified clue expression, in each of said answer candidates;
determine whether a combination of a noun and a polarity of a predicate, on which the noun depends, included in the result part of said specified causal relation expression, matches a combination of a noun and a polarity of a predicate on which the noun depends, included in the question;
determine a relevance of the specified causal relation expression in each of said answer candidates based on word matching and dependency tree matching between each of said answer candidates and said question, and
output, as features of said second feature set, information representing a result of the determination.

\* \* \* \* \*